US008006913B2

(12) United States Patent
Tsai

(10) Patent No.: US 8,006,913 B2
(45) Date of Patent: *Aug. 30, 2011

(54) METHOD FOR PRODUCING INDICATORS AND PROCESSING APPARATUS AND SYSTEM UTILIZING THE INDICATORS

(75) Inventor: Yao-Hung Tsai, Chupei (TW)

(73) Assignee: Sonix Technology Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/591,480

(22) Filed: Nov. 20, 2009

(65) Prior Publication Data

US 2010/0072282 A1 Mar. 25, 2010

Related U.S. Application Data

(60) Continuation of application No. 12/003,336, filed on Dec. 21, 2007, now Pat. No. 7,669,774, which is a division of application No. 10/189,244, filed on Jul. 2, 2002, now Pat. No. 7,328,845.

(30) Foreign Application Priority Data

Jan. 11, 2002 (TW) .............................. 91100350 A

(51) Int. Cl.
*G06K 19/06* (2006.01)
*G06K 7/10* (2006.01)
(52) U.S. Cl. ........................................ 235/494; 235/454
(58) Field of Classification Search .................. 235/454, 235/494
See application file for complete search history.

(56) References Cited

U.S. PATENT DOCUMENTS

| 4,627,819 A | 12/1986 | Burrows |
| 4,869,532 A | 9/1989 | Abe et al. |
| 5,329,108 A | 7/1994 | Lamoure |
| 5,416,312 A | 5/1995 | Lamoure |
| 5,473,536 A | 12/1995 | Wimmer |
| 5,852,434 A | 12/1998 | Sekundur |
| 5,866,895 A | 2/1999 | Fukuda et al. |
| 5,945,656 A | 8/1999 | Lemelson et al. |
| 5,959,285 A | 9/1999 | Schuessler |

(Continued)

FOREIGN PATENT DOCUMENTS

EP 0626660 A2 5/1994

(Continued)

OTHER PUBLICATIONS

"Handschrift Per Funk in Die Ganze Welt", Elektronik, Weka Fachzeitschriftenverlag, Poing, De. Vil. 49, No. 16, pp. 74-76, in German.

(Continued)

*Primary Examiner* — Daniel A Hess
(74) *Attorney, Agent, or Firm* — Jianq Chyun IP Office

(57) ABSTRACT

The present invention discloses a method for producing graphical indicators and interactive systems for utilizing the graphical indicators. On the surface of an object, visually negligible graphical indicators are provided. The graphical indicators and main information, i.e. text or pictures, co-exist on the surface of object. The graphical indicators do not interfere with the main information when the perception of human eyes are concerned. With the graphical indicators, further information other than the main information on the surface of object are carried. In addition to the main information on the surface of object, one is able to obtain additional information through an auxiliary electronic device or trigger an interactive operation.

9 Claims, 16 Drawing Sheets

U.S. PATENT DOCUMENTS

| | | |
|---|---|---|
| 6,229,964 B1 | 5/2001 | Bell |
| 6,412,695 B1 | 7/2002 | Reber et al. |
| 6,441,921 B1 | 8/2002 | Soscia |
| 6,460,766 B1 | 10/2002 | Olschafskie et al. |
| 6,473,762 B1 | 10/2002 | Knoblock et al. |
| 6,556,690 B1 | 4/2003 | Nelson |
| 7,017,806 B2 | 3/2006 | Peterson |
| 7,669,774 B2 * | 3/2010 | Tsai ................ 235/494 |
| 2002/0020750 A1 | 2/2002 | Dymetman et al. |
| 2004/0032505 A1 | 2/2004 | Silverbrook et al. |

FOREIGN PATENT DOCUMENTS

| | | |
|---|---|---|
| EP | 0764944 A2 | 8/1996 |
| JP | EP 0660261 A2 | 12/1994 |
| JP | 9-31382 | 2/1997 |
| JP | 10-251570 | 9/1998 |
| JP | 11-112787 | 4/1999 |
| JP | 2000-22930 | 1/2000 |
| JP | 2001-96889 | 4/2001 |
| JP | 2001-346032 | 12/2001 |
| JP | 2001-353955 | 12/2001 |
| WO | WO 00/73981 A1 | 5/2000 |

OTHER PUBLICATIONS

"E-Commerce Mit Stift auf Papier", CT Magazin Fuer Computer Technik, Heise Zeitschriften Verlag, pp. 22, in German.

"Printed Embedded Data Graphical User Interfaces", IEEE Service Center, vol. 34, No. 3, pp. 47-51 and 54.

* cited by examiner

Fig.1(A)
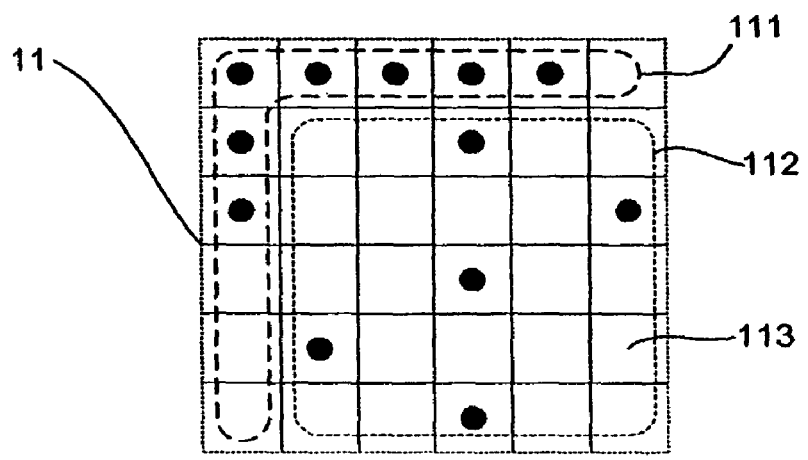
Fig.1(B)
Fig.1(C)

ABCDABCDABCDABCDABCDABCDABCDABCD
ABCDABCDABCDABCDABCDABCDABCDABCD
ABCDABCDABCDABCDABCDABCDABCDABCD
ABCDABCDABCDABCDABCDABCDABCDABCD

METHOD FOR PRODUCING INDICATORS AND PROCESSING APPARATUS AND SYSTEM UTILIZING THE INDICATORS

CROSS REFERENCE FOR RELATED APPLICATIONS

This application is a Continuation of U.S. application Ser. No. 12/003,336 filed on Dec. 21, 2007 now U.S. Pat. No. 7,669,774, which is a Divisional of U.S. application Ser. No. 10/189,244 filed on Jul. 2, 2002 now U.S. Pat. No. 7,328,845. Priority is claimed on U.S. application Ser. No. 12/003,336 filed on Dec. 21, 2007, which claims the priority of U.S. application Ser. No. 10/189,244 filed on Jul. 2, 2002, which claims the priority date of R.O.C. patent application Ser. No. 091100350 filed on Jan. 11, 2002, all of which is incorporated by reference

BACKGROUND OF THE INVENTION

1. Field of the Invention

The present invention relates to a method for producing indicators and processing apparatus and system utilizing the indicators, and more particularly, to a method, an apparatus and a system for providing additional information from the indicators affixed onto the surface of an object.

2. Description of the Prior Art

Dating back to ancient time, people start delivering information by recording information on surfaces of various objects. For example, since the birth of paper, people acquire the information through characters and drawings affixed on papers. Furthermore, in recent years, with distinctive colors, characters, or pictures attached to different locations on surface of an object, people try to disclose the information with regard to each different position of the object.

When people observe the surface of object, they generally capture the information visually. However, the amount or types of the information carried by the surface of object are generally limited under the restrictions of the area size, beautification of the surface.

Nowadays, due to the advance of electronic technology, the visual information has been retrieved from its original carrier and stored as the digital information in an electronic apparatus. And people read them directly from the electronic apparatus. However, it is difficult for the digital information to totally replace the information printed in books or information attached to the surface of object.

On the other hand, through hyper link approach of computer technology, the digital information can be displayed in multiple dimensions, while the information printed in book or attached to the object still are displayed in two dimensions. Thus, if multiple dimensions information can be recorded on the book or the object, people can acquire additional information through the electronic apparatus.

SUMMARY OF THE INVENTION

One aspect of the present invention is to provide a method for producing graphical indicators. Some visually negligible graphical indicators are affixed on the surface of an object. The graphical indicators co-exist with main information, such as a text or picture, on the surface of object, and do not interfere with the perception of human eyes to the main information. A user retrieves the graphical indicators through an electronic system that does not couple with the object and acquires additional information from the graphical indicators.

Another aspect of the present invention provides an apparatus and a system utilizing the graphical indicators. The apparatus or the system includes an optical-reading device, a processing device, and an output device. The optical-reading device captures an image including the graphical indicators from the surface of object, the processing device, responsive to the graphical indicators, acquires the corresponding additional information by processing and/or transforming the graphical indicators, and the output device outputs the additional information.

BRIEF DESCRIPTION OF THE DRAWINGS

FIG. 1(A) is a schematic diagram illustrating the graphical indicators on the surface of object in accordance with the present invention;

FIG. 1(B) is an enlarged diagram illustrating one of the graphical indicators in FIG. 1(A);

FIG. 1(C) is a schematic diagram illustrating the combination of the graphical micro-units in FIG. 1(B) converting into the bit array;

FIG. 1(F) illustrates the image corresponding to the matrix form of the graphical indicators converted into a bit matrix form in accordance with the present invention;

FIG. 12(B) is a graph illustrating use of indicators of the present invention.

IV. DETAILED DESCRIPTION OF THE PREFERRED EMBODIMENT

Figure 1D:
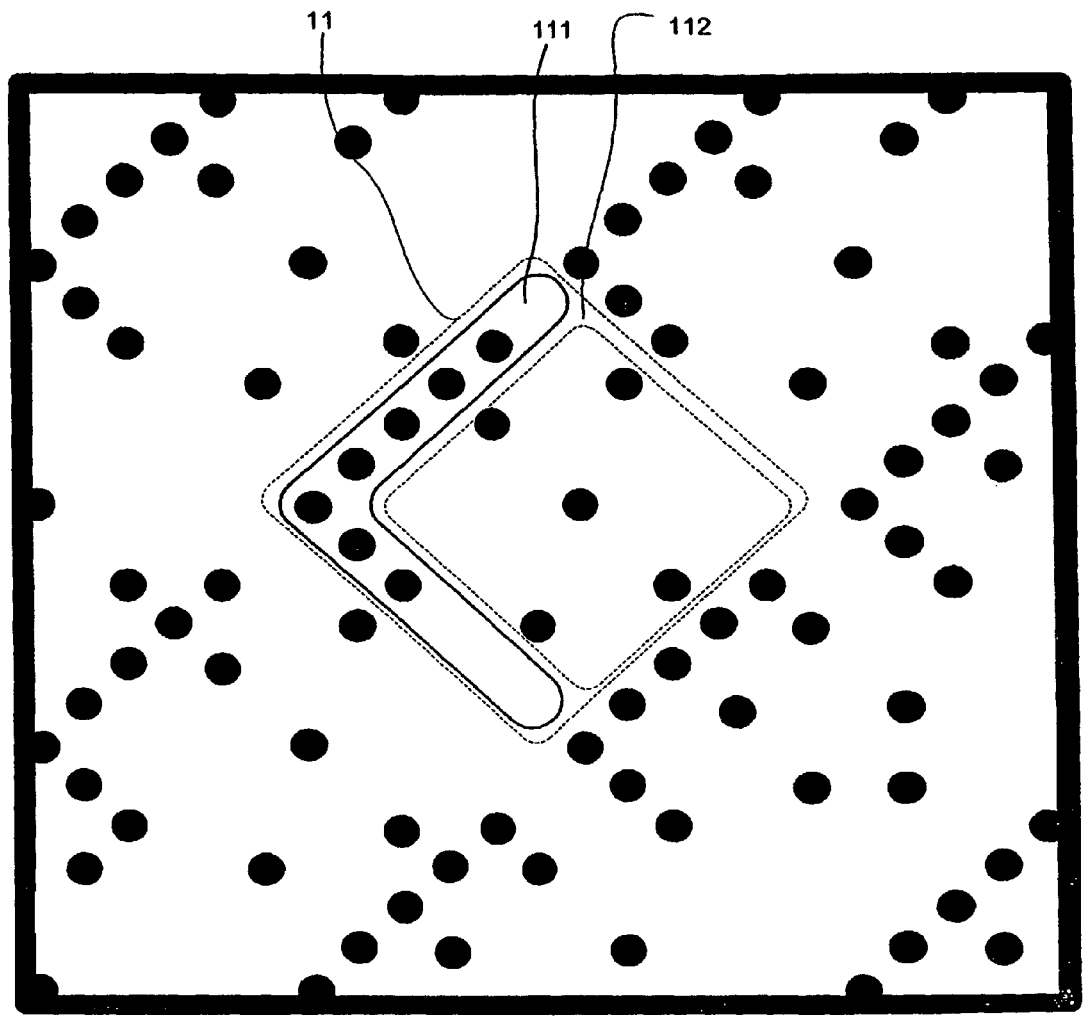
FIG. 1(D) is a schematic diagram illustrating the two-dimensional matrix form in accordance with the present invention.

The present invention provides a method for producing graphical indicators and interactive systems for utilizing the graphical indicators. Some visually negligible graphical indicators are affixed on the surface of an object. The graphical indicators co-exist with a main information, such as a text or picture, on the surface of object, and do not interfere with the perception of human eyes to the main information. A user retrieves the graphical indicators through an electronic system and acquires additional information from the graphical indicators. The user can utilize the graphical indicators without a complicated platform providing coordinate system. Furthermore, the typical book or the surface of object can carry more information through the graphical indicators.

(A) Exemplary Design for the Graphical Indicators

In the present invention, one aspect of the graphical indicators is that the graphical indicators are so visually negligible that do not interfere with the main information on the surface of object. Another aspect of the graphical indicators is that the graphical indicators are not interfered by the other information on the surface when the electronic system reads the graphical indicators.

For the visually negligible feature of graphical indicator, each graphical indicator includes multiple graphical micro-units arranged in a layout. Shown in FIG. 1(A), which has scale of 2.5:1, the combination 100 of the graphical micro-units in a background to "APPLE" is the matrix consisting of graphical micro-units. The micro-units can be reduced further such that the combination 100 of the graphical micro-units is visually negligible or is viewed as a background material by human eyes.

In practical application, the shape of the graphical micro-units may be regular or irregular shape, such as a round spot. For best result, the graphical micro-unit must be so tiny that only a microscope apparatus can detect it.

When the graphical micro-units are tiny and arranged loosely in the layout, the user easily neglects the combination 100 of graphical micro-units and pays attention to main information, like the word "APPLE" depicted in FIG. 1(A). Next, we explain how to use the graphical indicator to carry information.

The combination 100 of the graphical micro-units consists of multiple graphical indicators arranged in sequence. Each graphical indicator includes multiple state zones for selectively respectively storing the graphical micro-units; wherein each of the state zones displays a state from at least two candidate states.

For example, shown in FIG. 1(B) is an enlarged diagram illustrating one of the graphical indicators in FIG. 1(A). The graphical indicator 11 includes 36 units of state zones 113 in the form of 6 by 6 matrix. Each state zone 113 selectively includes one graphical micro-unit or does not include the graphical micro-unit to represent the first or second state.

When the micro-units in state zone 113 of the first state are assigned value of one and those of the second state are assigned value of zero, a bit matrix form 114 shown in FIG. 1(C) is resulted. Thus, the bit matrix form 114 stores a variety of information as expected or desired. In other word, the user can store desired information based on the combination of different values of the state zones.

Furthermore, the multiple graphical indicators, as well as the graphical micro-units, are arranged in two-dimension matrix forms. Such arrangements of the graphical indicators and the graphical micro-units look homogenous to human eyes. Next, the present invention provides a method for retrieving the individual graphical indicator from the matrix form of the graphical indicators.

Shown in FIG. 1(B), which has scale of 100:1, the graphical indicator 11 includes a header information 111 and a content information 112 arranged in a layout that corresponds to different indicator information. In one embodiment, all header information 111 are identical among different graphical indicators 11. However, for a more comprehensive design, more than one set of header information may be employed as long as each header information within each graphical indicator is capable of distinguishing the corresponding graphical indicator from adjacent graphical indicators and indicating the orientation of the corresponding graphical indicator to the optical device. On the other hand, different value of content information 112 represents different indicator information. Thus, one graphical indicator 11 is read through capturing one header information 111, and the graphical indicator 11 does not interfere with each adjacent graphical indicator 11. However, in another embodiment, the header information 111 in one graphical indicator 11 may be different from that of other graphical indicator 11 as long as the system can use the header information to retrieve the corresponding content information.

FIG. 1(D), which has scale of 120:1, is a schematic diagram illustrating the two-dimensional matrix form in accordance with the present invention. The user first searches the header information 111 and further retrieves the graphical indicator 11 and the corresponding content information 112.

Furthermore, in order to rapidly retrieve the indicator information, the image corresponding to the matrix form of the graphical indicators is rotated and converted into bit matrix form, shown in FIG. 1(F) during the process.

Furthermore, we divide the surface of object into multiple index zones. Each zone corresponds to an index value. The graphical indicator corresponding to identical indicator information is repeatedly arranged in each index zone. The graphical indicator corresponding to different indicator information is repeatedly arranged in different index zones. The system maker of the invention records the corresponding relationship of the indicator information to the index zone in an electronic apparatus. When the electronic apparatus captures an image from a index zone, it can acquire the index value of the zone using the corresponding relationship.

Figure 1E:
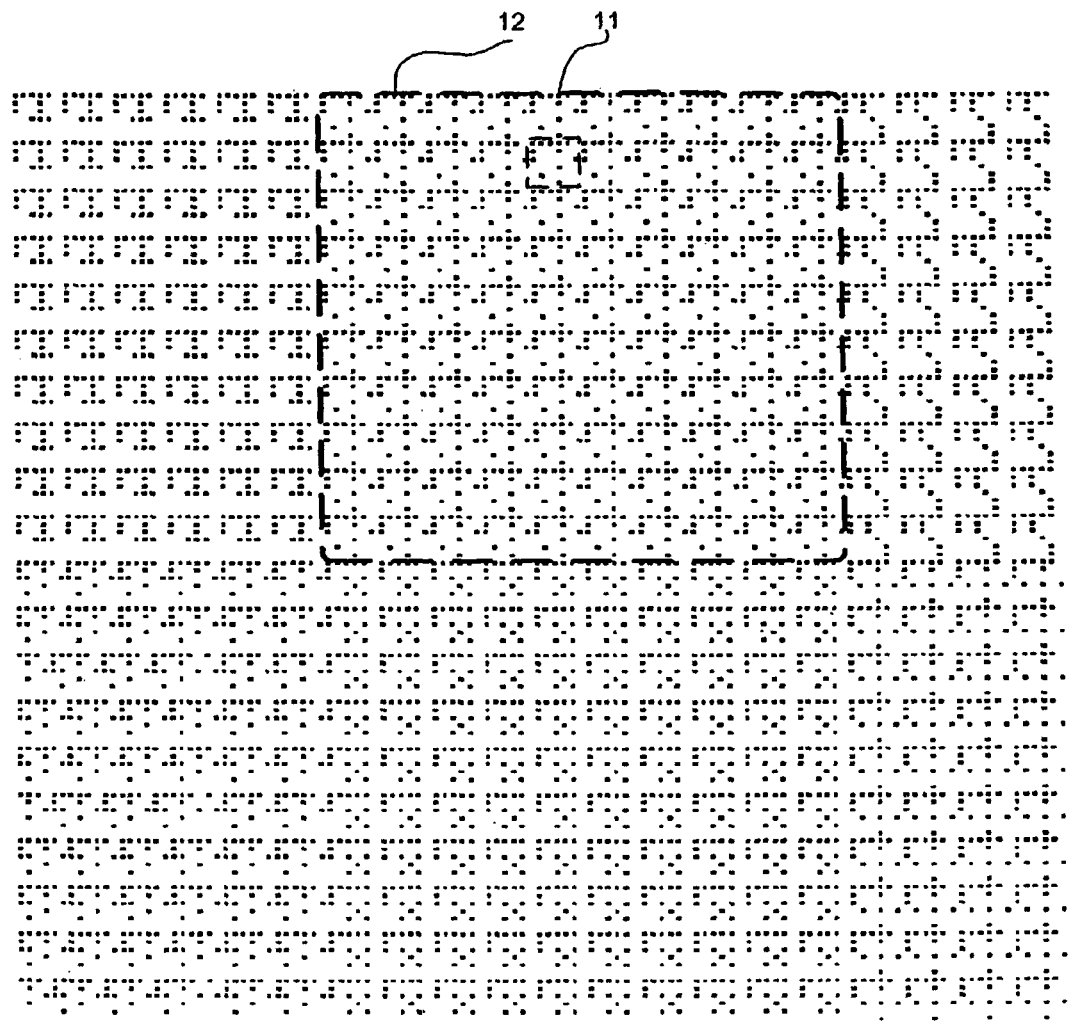
FIG. 1(E) is an enlarged diagram illustrating the index zones and the graphical indicators in accordance with the present invention.
Figure 1F:
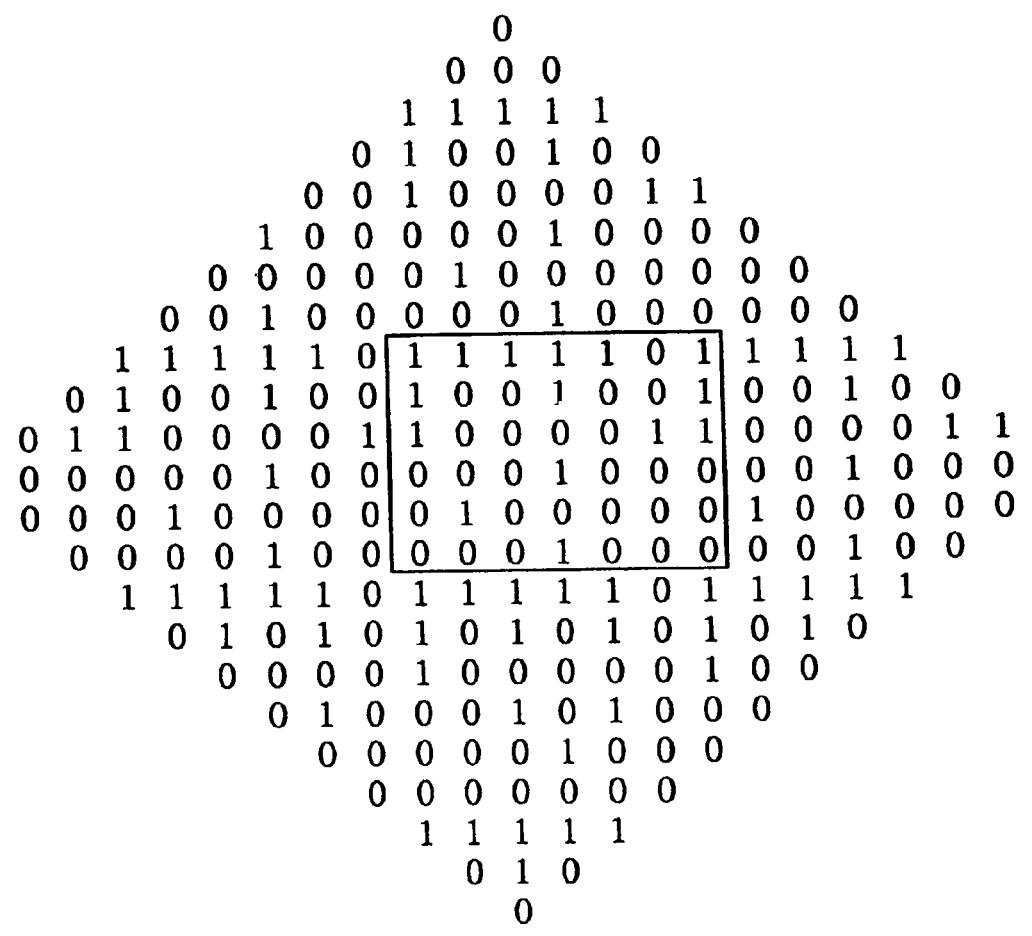

For example, FIG. 1(E), which has scale of 20:1, is an enlarged diagram illustrating the index zones and the graphical indicators in accordance with the present invention. The graphical indicators 11 corresponding to same indicator information are arranged in the index zone 12. The graphical indicators corresponding to different indicator information are respectively arranged in the other index zones.

Figures 2A, 2B, 2C:
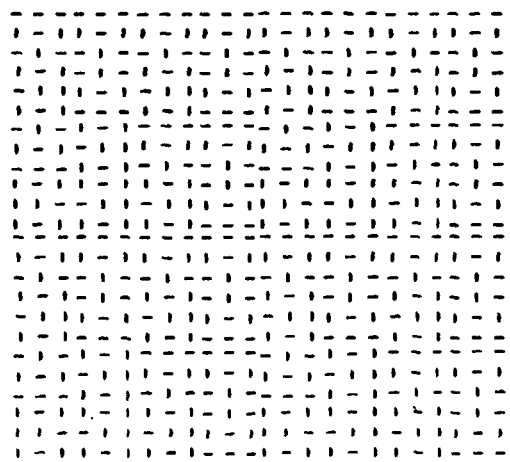
FIGS. 2(A)-2(C) are the diagrams illustrating various embodiments in accordance with the present invention.

Other embodiment for the graphical indicators is possible. For example, FIGS. 2(A)-2(C) are the diagrams illustrating other embodiments for the graphical indicators in accordance with the present invention. Shown in FIGS. 2(A)-2(C), a vertical segment represents the first state, and a horizontal segment represents the second state.

Figures 2D, 2E:
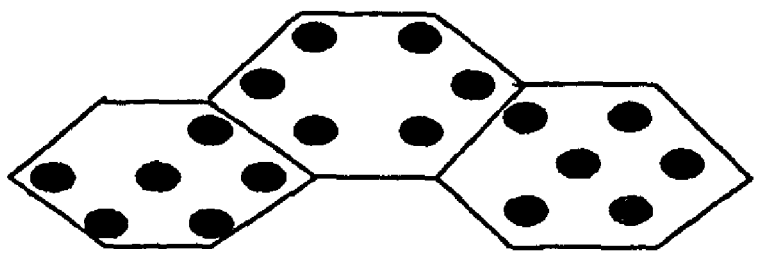
FIG. 2(D) is the diagram illustrating other embodiment for the arrangement of the graphical indicators in accordance with the present invention.
FIG. 2(E) is the diagram illustrating the different graphical indicators arranged in a index zone in accordance with the present invention.

Furthermore, FIG. 2(D) is the diagram illustrating other embodiment for the arrangement of the graphical indicators in accordance with the present invention. Different from the matrix arrangement in FIGS. 1(A)-1(F), a cellular arrangement is set forth in FIG. 2(D).

Alternately, different graphical indicators may also be arranged in one index zone as shown in FIG. 2(E). The letters "A", "B", "C", and "D" respectively represent four different graphical indicators corresponding to four different indicator information. These four different graphical indicators are repeatedly arranged in sequence within one index zone, shown in FIG. 2(E).

There are requirements for the graphical indicators being negligible to human eyes. First, each graphical indicator must be tiny and human eyes can not differentiate one graphical indicator from others. Second, according to the size of the graphical micro-unit, the pitch between micro-unit, and the desired visual effect, one should reduce the number of the graphical micro-units used. In this way, the graphical indicators have little influence on the brightness of the surface of object. Furthermore, number of graphical micro-units of each graphical indicator is substantially equal to each other, and therefore the graphical indicators look more homogenous to human eyes and become invisible to human eyes.

In a first embodiment, each square centimeter of the selected zone includes more than 3000 state zones of which less than seventy percent are in the first state, and percentage of area occupied by the graphical micro-unit in the state zone is less than 80.

In a second embodiment, each square centimeter of the selected zone includes more than 6000 state zones of which less than seventy percent are in the first state, and percentage of area occupied by the graphical micro-unit in the state zone is less than 80.

The following provides the methods for capturing the graphical indicators by an electronic system without interference with main information on the surface of object.

First, a method utilizing infrared ray and oil ink is illustrated below.

While printing the information on conventional media, a desired color is obtained by combining primitive color inks: cyan (C), magenta (M), yellow (Y), and black (K). Generally, hue and saturation are obtained by adjusting combination of C, Y, and M, and brightness is obtained by adjusting K.

It is noted that infrared ray has high transmittance for most of C, M, Y primitive color inks, but has low transmittance for most of K color inks. In other words, C, M, Y color inks hardly absorb the infrared ray, but black color ink substantially absorbs the infrared ray. Therefore, infrared ray transmits through most of C, M, Y color inks and displays high brightness after reflecting from a light-coloured object surface under C, M, Y color inks. On the contrary, the surface that is printed in black color ink displays low brightness because of the absorption of the infrared ray by most of black color ink. Thus, when a detector receives an image corresponding to graphical indicators printed in most of black color ink, the image does not interfere with main information printed in most of C, M, Y color inks.

On the other hand, when the main information needs to be printed in black, one type of black color, in the specification we called it Near_K, which hardly absorbs infrared ray, is used to print the main information. Mixing C, M, Y colors under predetermined ratio makes Near_K that displays visual black, such as dark indigo or dark brown. The ratio for mixing C, M, Y colors to obtain Near K color is well known to the people skilled in the art. Since Near_K is made by C, M, Y color inks, Near_K is transmittable by infrared ray. And, to cooperate with this arrangement, the graphical indicators are printed using K (black) color.

In the above description, the black color is used for an example and, however, it is not a limitation. Other inks that can substantially absorb the infrared ray can be used to print graphical indicators. This approach has advantage of low cost. It is to be noted that any type of oil ink, no matter what color it shows, that could substantially absorb infrared ray, are suitable for the print of graphical indicator and are intended scope of protection of present application. Any types of oil ink, that are transmittable by infrared and are close to black visually, i.e. some oil ink of edibility-class without carbon element, can also be used as Near-K color. Near-K color may act as role of black color of four primitive colors (C,M,Y,K) while printing the main information over the surface.

On the other end, it is known that most oil inks absorb ultra-violent or blue light. That is, they do not produce light in visible spectrum when irradiated by ultra-violent or blue light. However, special type ink, such as fluorescent ink, produces visual image under the irradiation of ultra-violet or blue light. Thus, under this approach, the graphical indicators are printed in fluorescent ink, and the main information is printed in a typical oil ink. To cope with the arrangement, ultra-violent or blue light is used to irradiate the surface of object while reading the image. Afterwards, the non-interference image can be obtained by implementing an optical filter for filtering out unwanted spectrum portion.

Another method is to directly use visual light. Since there are many graphical indicators that are not overlapped with the main information, as long as the detector detects single graphical indicator, the indicator information can be obtained.

There are more than one approaches to generate (prepare) the indicator information. For example, the additional information is encoded into the indicator information by method of compressed encoding. When the electronic system retrieves the indicator information, it acquires the additional information by decoding the indicator information. When this approach is adopted, the processing device of the invention, responsive to the graphical indicators, acquires the corresponding additional information by processing (decoding) the graphical indicators.

Another way to obtain the additional information from the indicator information is using a mapping unit stored in the electronic system. The embodiments of the mapping unit include a database or a lookup table, etc. Actual implementations for the mapping unit include a hard disk, a floppy disk, a compact disk, a read-only memory, or a memory card. The electronic system acquires the additional information corresponding to the indicator information through the mapping unit. When this approach is adopted, the processing device, responsive to the graphical indicators, acquires the corresponding additional information by transforming the graphical indicators. Furthermore, for a more complicated design, the processing device, responsive to the graphical indicators, acquires the corresponding additional information by processing and/or transforming the graphical indicators.

(B) Exemplary Electronic System Utilizing the Graphical Indicators

Figure 3:
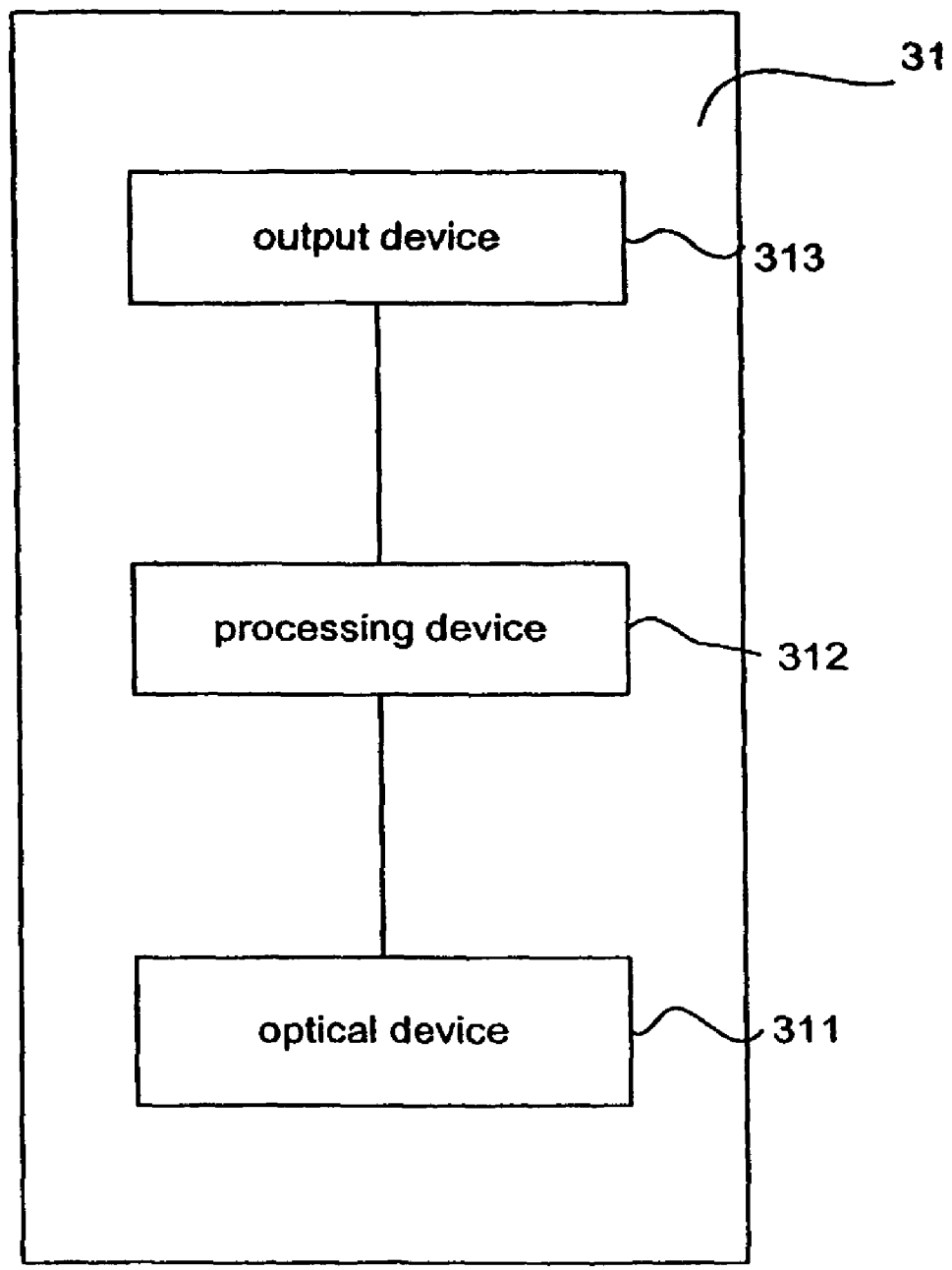
FIG. 3 is a schematic diagram illustrating an electronic system in accordance with the present invention.

FIG. 3 is a schematic diagram illustrating an electronic system 31 in accordance with the present invention. The electronic system 31 includes an optical device 311, i.e. an image acquiring device, a processing device 312, i.e. an image-processing circuit, and an output device 313, i.e. an output circuit. The processing device 312 is wired or wireless coupled to the optical device 311. Similarly, the processing device 312 is wired or wireless coupled to the output device 313.

Figure 4:
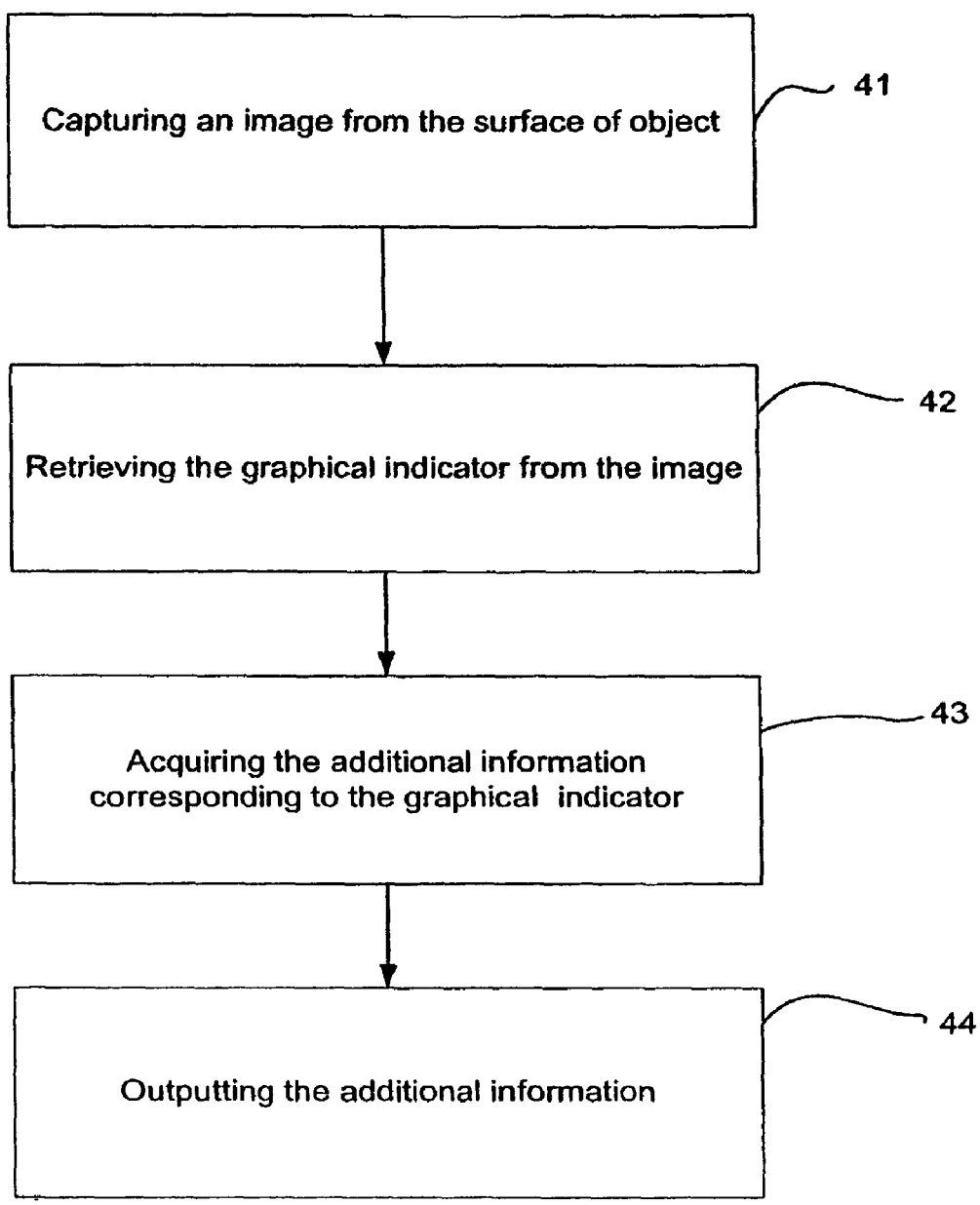
FIG. 4 is a schematic flowchart illustrating the operation of the electronic system in accordance with the present invention.

FIG. 4 is a schematic flowchart illustrating the operation of the electronic system in accordance with the present invention. The optical device 311 captures an image from the surface of object (step 41) that includes the graphical indicator. Next, the processing device 312 retrieves the graphical indicator from the image (step 42) and acquires the additional information corresponding to the graphical indicator (step 43). The output device 313 receives the additional information from the processing device 312 and outputs the additional information (step 44).

Figure 5:
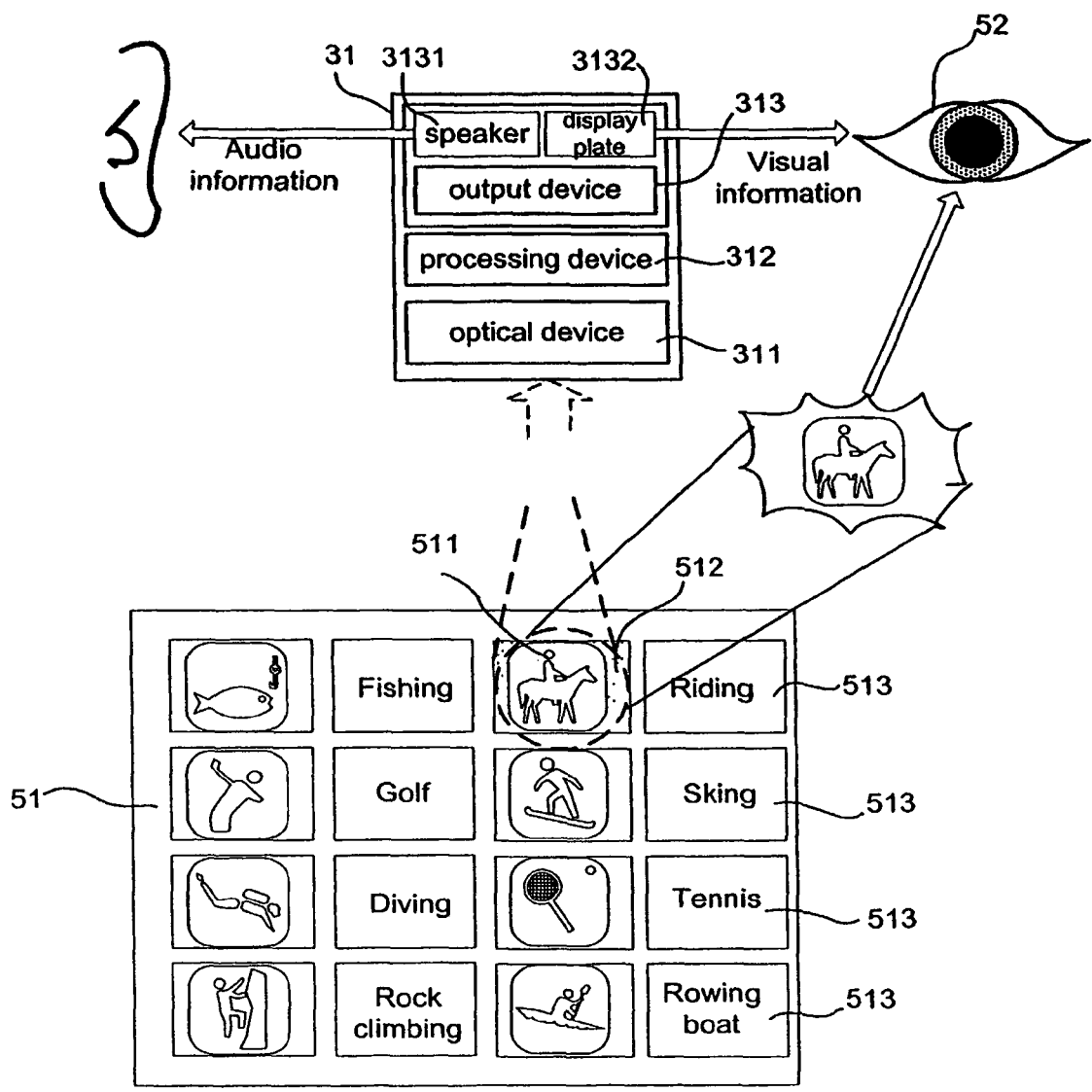
FIG. 5 is an embodiment of the processing system in accordance with the present invention.

FIG. 5 is an embodiment of the processing system in accordance with the present invention. The main information is printed on the surface of an object 51. The main information in the embodiment includes multiple icons 511 and corresponding illustrations 513. Such main information is generally used in a typical language-learning book or children-teaching book. The object is made of plastic, paper, or any printable carriers.

In addition, the surface of object 51 includes multiple index zones on which respective icons 511 and illustrations 513 are affixed. In particular, the index zone corresponding to the icon 511 is printed with multiple identical graphical indicators 512. To illustrate clearly, the graphical indicator 512 is visible. But in actual practice, the graphical indicator 512 may be so tiny as to be non-visible to human naked eyes.

In this embodiment, the icon 511 is directly captured by human eyes 52. In addition, the electronic system 31 is used to acquire the additional information corresponding to the graphical indicator 512.

As the electronic system 31 is directed to a zone to that the graphical indicator 512 is affixed, the optical device 311 captures the image including the graphical indicator 512 and transfers the image to the processing device 312. Then the processing device 312 retrieves the graphical indicator 512 from the image and acquires the additional information corresponding to the graphical indicator 512. In the embodiment, the additional information includes audio information, such as pronunciations of horse in English or other visual information, such as illustration of horse. Then the output device 313 outputs the audio information with a speaker 3131 and the visual information with a display panel 3132. In addition, other types of information sensible by human being, such as olfactory or tactual information, can also be outputted.

Figure 6:
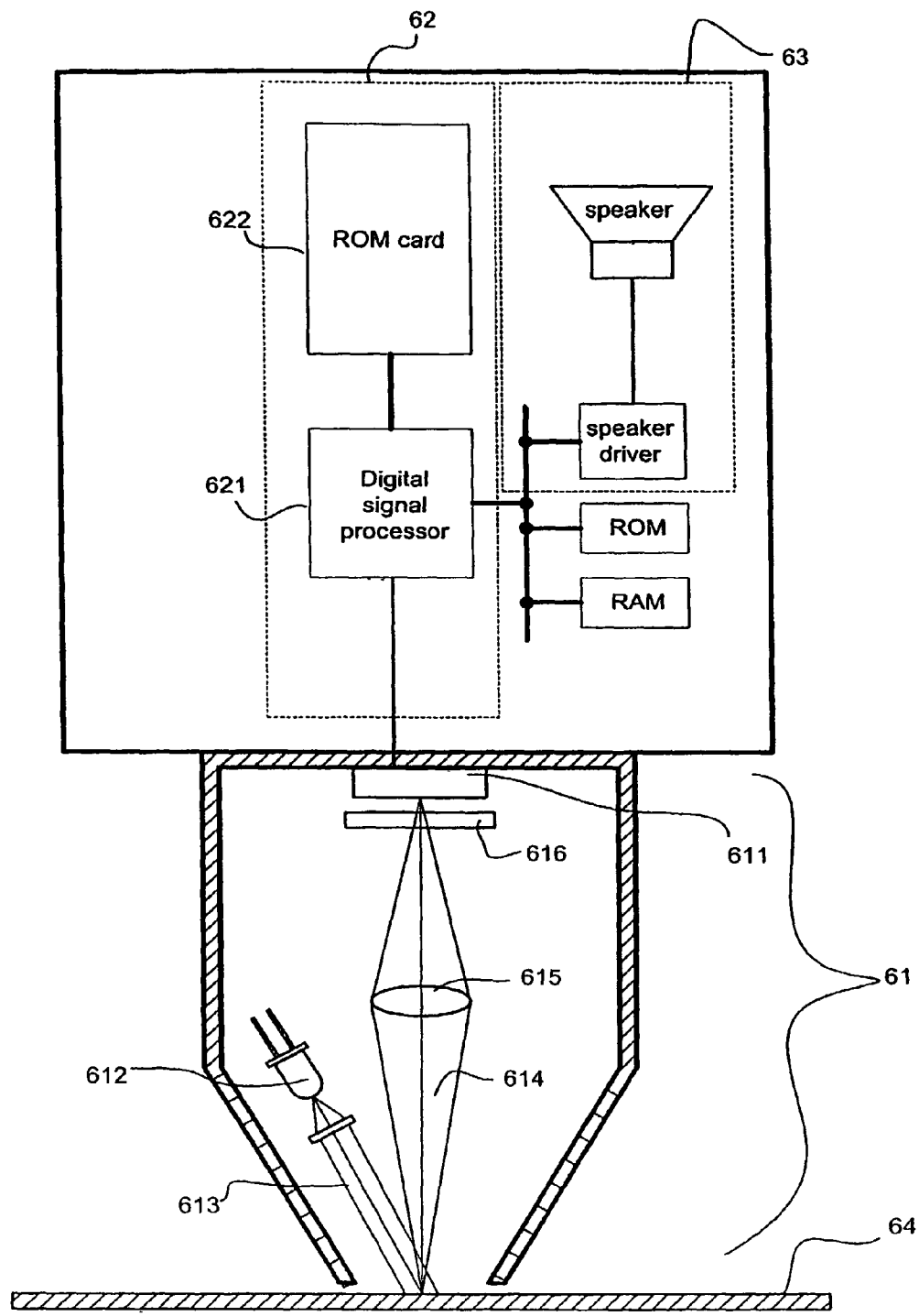
FIG. 6 is a schematic diagram illustrating the electronic apparatus in accordance with the present invention.

FIG. 6 is a schematic diagram illustrating details of the electronic apparatus in accordance with the present invention. In the embodiment, the electronic apparatus includes an optical-reading device 61, an image-processing circuit 62, and an output circuit 63. The optical-reading device 61 includes one or more sensor units 611 and one or more active light source 612. The exemplary sensor unit 611 includes sensor micro-units, such as charge couple devices (CCD) or CMOS sensor units. In the embodiment, the image-processing circuit 62 includes a digital signal processor 621 (DSP) and a read-only memory card (ROM card) 622. The read-only memory card (ROM card) 622 functions as a mapping unit.

Figure 7:
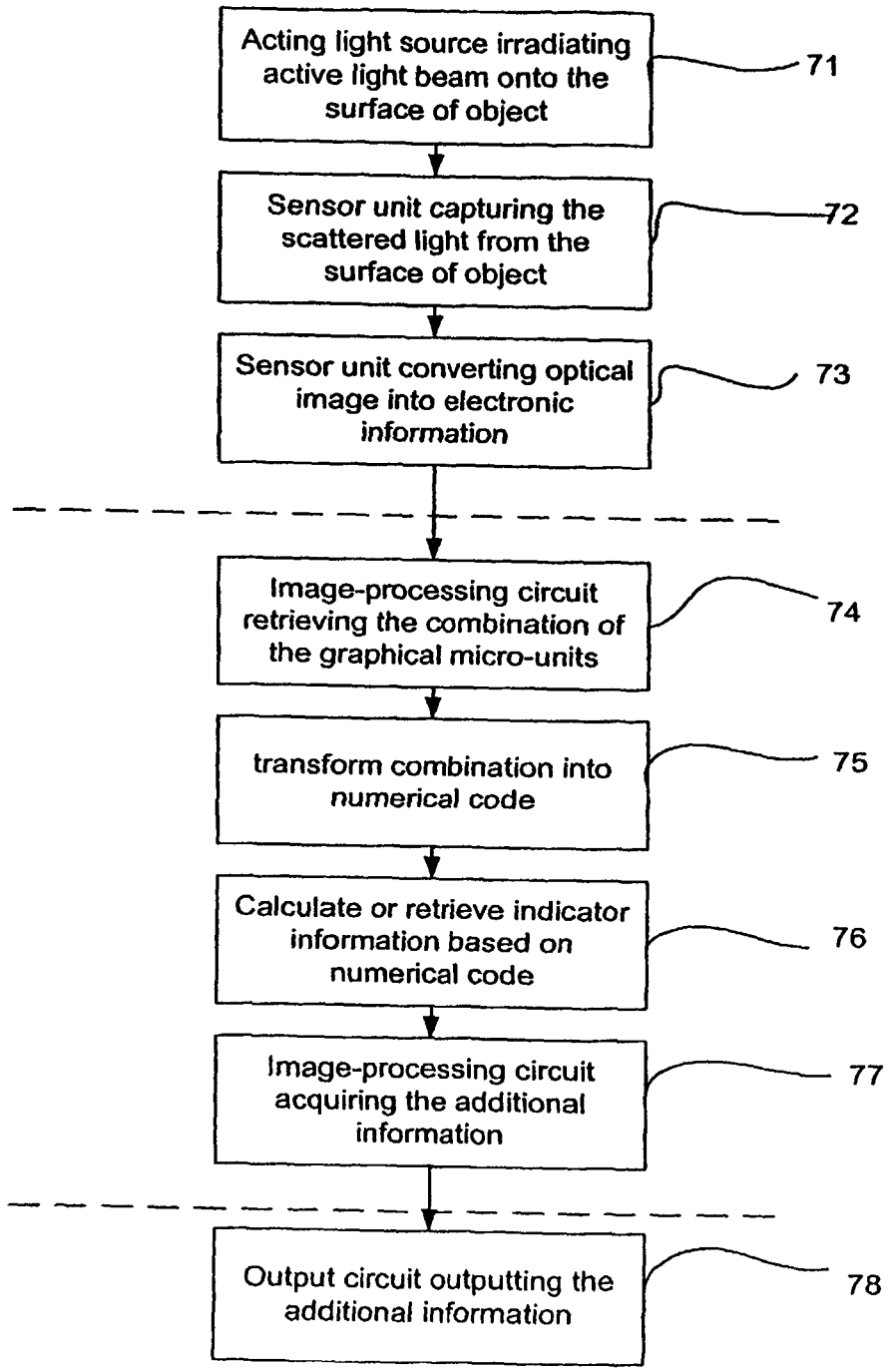
FIG. 7 is a schematic flow chart illustrating the operation of the electronic apparatus in accordance with the present invention.

FIG. 6 and FIG. 7 together illustrate the operation of embodiment. FIG. 7 is a schematic flow chart illustrating the operation of the electronic apparatus in FIG. 6. The active light source 612 of the optical-reading device 61 irradiates active light beam 613 onto the surface of object 64 (step 71). The surface of object 64 absorbs the portion of the active light beam 613 and reflects or scatters the light. The sensor unit 611 captures the scattered light 614 through subsequent lens 615 and an optic filter 616 to form an image (step 72) and converts the image into electronic information (step 73).

The sensor unit 611 transfers the electronic information to the image-processing circuit 62 for image processing purpose. The image-processing circuit 62 extracts the combination of the graphical micro-units from the electronic information (step 74). The exemplary combination of the graphical micro-units is denoted as 100 in FIGS. 1(A) to 1(E). Next, the image-processing circuit 62 converts the combination of the graphical micro-units into the numeral codes (step 75). For example, the combination of the graphical micro-units in FIG. 1(B) converts into the bit array shown in FIG. 1(C). Then the image-processing circuit 62 retrieves the indicator information according to the numeral codes (step 76) and further acquires the additional information corresponding to the indicator information (step 77). In the embodiment, the ROM card 622 stores the mapping relationship of the indicator information and the additional information. The digital signal processor 621 executes the image process above-mentioned.

Next, the output circuit 63 outputs the additional information (step 78). In the embodiment, the additional information is audio information. The output circuit 63 includes a speaker that outputs the audio information corresponding to the zone on the surface of object irradiated by the active light source 612.

Alternatively, the read-only memory card (ROM card) 622 per se includes a built-in digital signal processor. Under this arrangement, the mapping unit, i.e. read-only memory card (ROM card) 622, retrieves additional information corresponding to the indicator information responsive to the command from digital signal processor 621.

Figure 8:
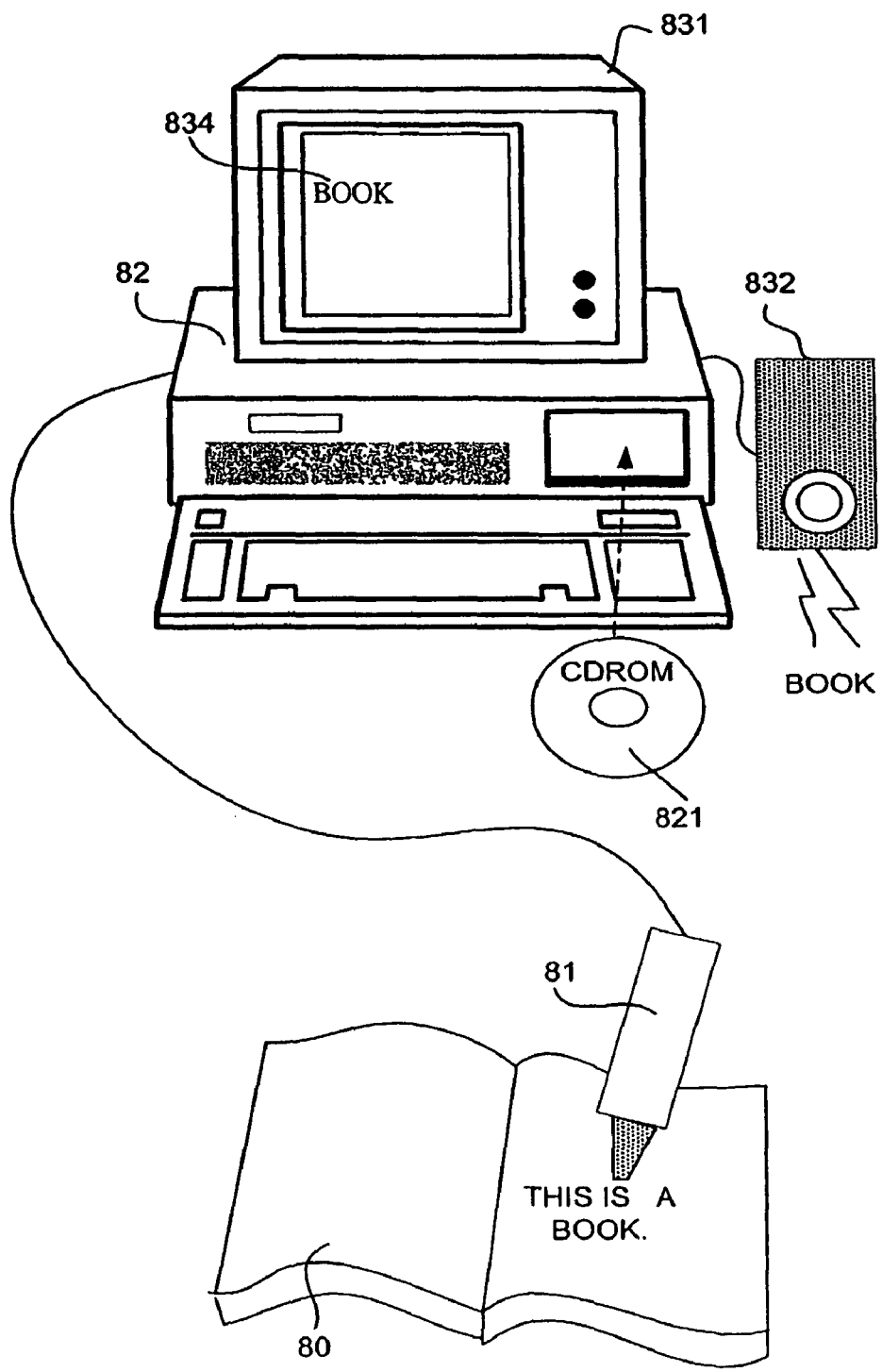
FIG. 8 is a schematic diagram illustrating one practical application in accordance with the present invention.

FIG. 8 is a schematic diagram illustrating one practical application in accordance with the present invention. In the embodiment, the optical device includes an input pen 81. The processing device is embedded in a general-purpose computer 82 and is programmable. The output device includes a monitor 831 and a speaker 832. The book 80 has the graphical indicators of the present invention at predetermined locations, and a disc 821 is accompanied with the book 80. When the user directs the input pen 81 to the selected zone of the book 80, such as zone at which "BOOK" is printed, the optical device of the input pen 81 captures the image of the selected zone and transfers it to the general-purpose computer 82 run by the program in the disc 821. The general-purpose computer 82 processes the image and acquires the additional information under control of the disc 821, and retrieves the additional information. The additional information includes the explanation of the graphical indicators retrieved and the audio information. Next, the monitor 831 coupled to the general-purpose computer 82 outputs an illustration 834, as well as the speaker 832 outputs the audio information.

Furthermore, the additional information may also include commands for controlling other interactive devices.

(C) Application for Input of Information

Figure 9:
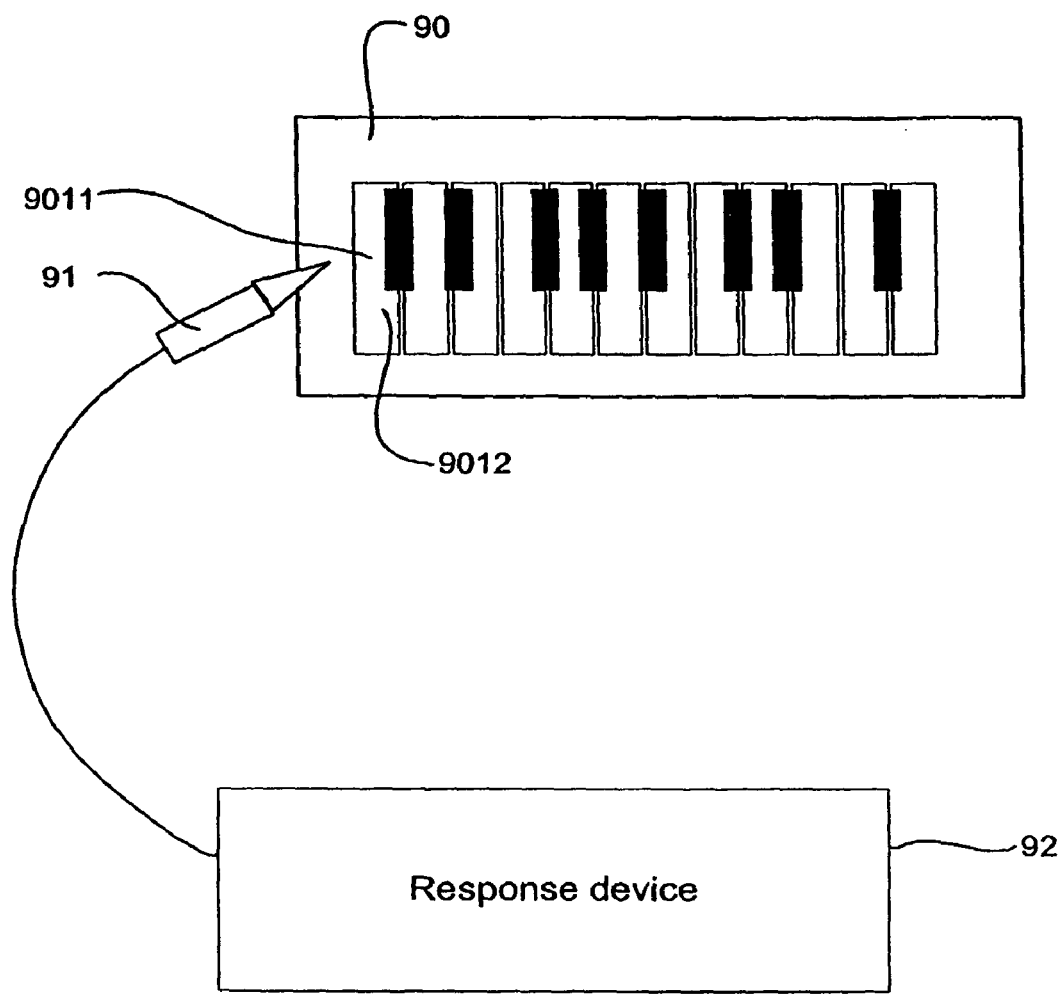
FIG. 9 is a schematic diagram illustrating the additional information used for controlling a response device in accordance with the present invention.

FIG. 9 is a schematic diagram illustrating the additional information used for controlling a responsive device in accordance with the present invention. The surface of object 90 includes multiple index zones, and each index zone has one main information 9011, such as alphanumeric information on a conventional key cap. Furthermore, one desired graphical indicator 9012 is affixed to the same index zone.

The optical device of an electronic system 91 captures the image including the graphical indicator 9012. The processing device of the electronic system 91 retrieves the graphical indicator 9012 from the image and acquires the additional information corresponding to the graphical indicator 9012. The additional information is a command corresponding to the main information 9011. The electronic system 91 transfers the command to a response device 92. For instance, the response device 92 may be an audio device capable of generating sound of corresponding piano key. Under the same concept while altering the patterns, the object 90 may easily become a computer keyboard or calculator keyboard. The response device 92 may include mobile phone, personal digital assistant, notebook, and other electronic devices.

Figure 10:
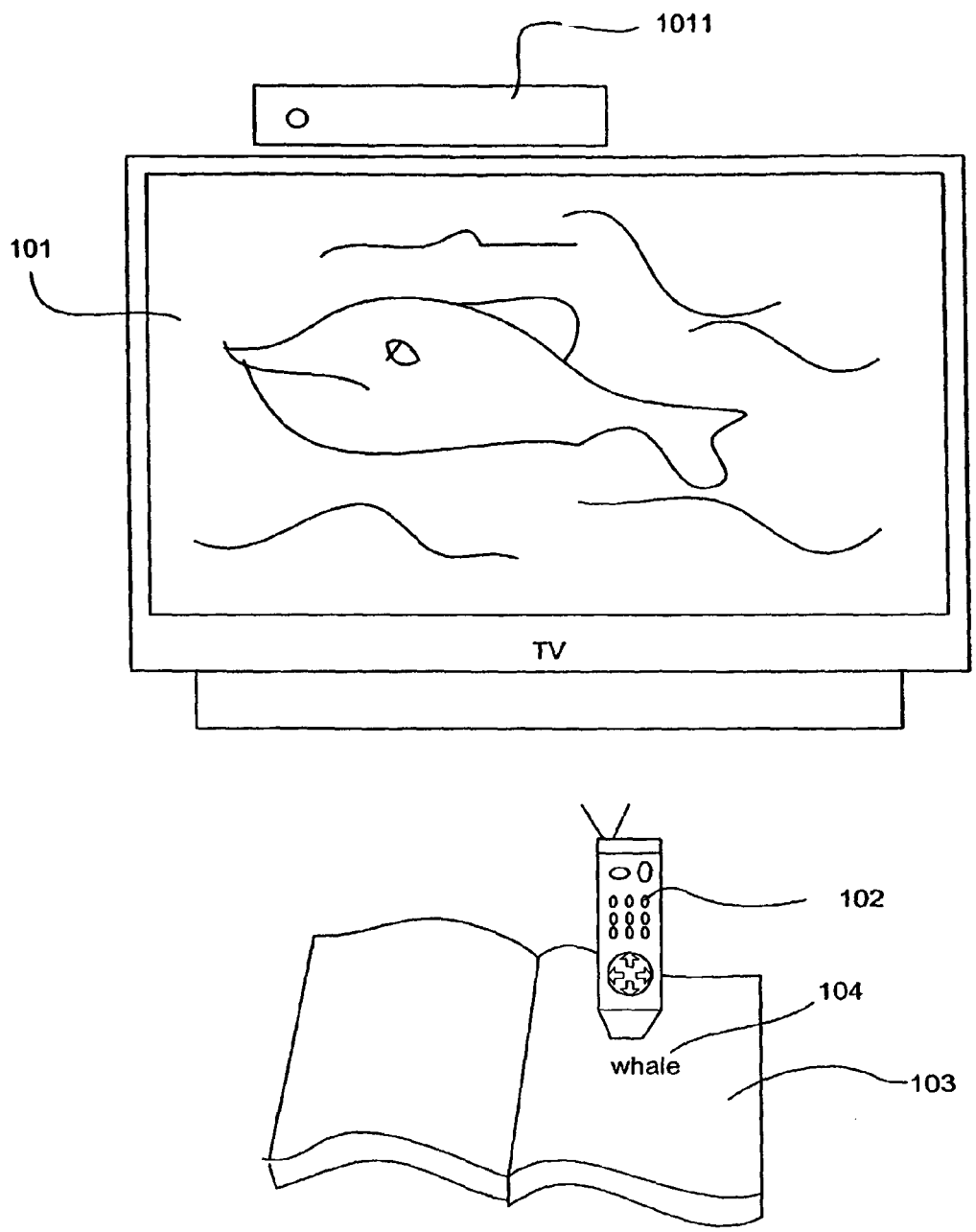
FIG. 10 is a schematic diagram illustrating the application of the present invention to information appliances.

FIG. 10 is a schematic diagram illustrating the application of the present invention to information appliances. An interactive television 101 is equipped with a set top box 1011 for receiving user-interactive commands. A brochure 103 provided by cable TV program supplier is designed to include the graphical indicator of the invention. When the user selects one program 104 with an input device within the remote selector 102, the input device retrieves the graphical indicator from the image of the program 104 and acquires the additional information corresponding to the graphical indicator. In the embodiment, the additional information is a command to the set top box 1011. The output device in the remote selector 102 is an infrared emitter for transferring the command to the set top box 1011. Thus, the present invention provides an input solution for the interactive television 101.

(D) Application for Control Function

Figure 11:
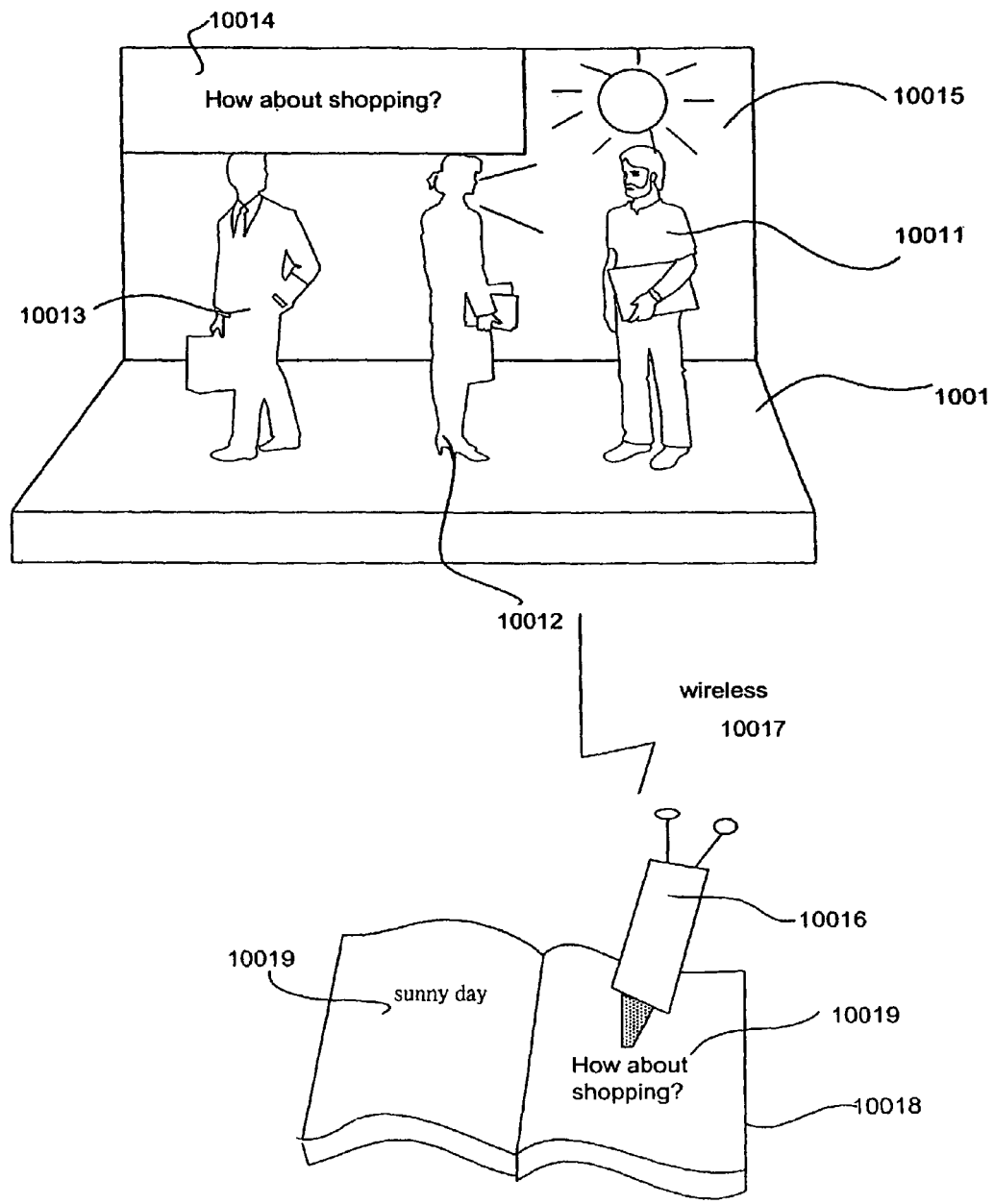
FIG. 11 is a schematic diagram illustrating the additional information used to control other devices.

Besides visual, olfactory or vibrating effects, the additional information includes controlling commands. FIG. 11 is a schematic diagram illustrating the additional information used to control other devices. As indicated, a response device 1001 includes puppets 10011, 10012, 10013, word-line display panel 10014, and display panel 10015. A script book 10018 is provided to include the graphical indicators corresponding to the contents. The user selects the specific content with the electronic device 10016. For example, if the user would like to have a sunny day displayed in the display panel 10015, he or she captures the corresponding graphical indicator on the script book 10018 using the electronic device 10016. The electronic device 10016 retrieves the graphical indicator and acquires the corresponding additional information. The additional information is the command 10017 transmitted for controlling the response device 1001. The electronic device 10016 transfers the command 10017 to the response device 1001 through wireless or infrared transmission. The response device 1001 displays the sunny day on the display panel 10015 in response to the command 10017.

As the electronic device 10016 is denoted to a dialogue 10019, the electronic device 10016 retrieves the graphical indicators corresponding to the dialogue 10019 and then acquires a command of additional information. The electronic device 10016 transfers the command to the response device 1001 and the puppet 10012. The response device 1001 displays the dialogue 10019 on the word-line display panel 10014, and the puppet 10012 speaks dialogue when making the action.

(E) Substitute for Bar Code

Figures 12, 12A:
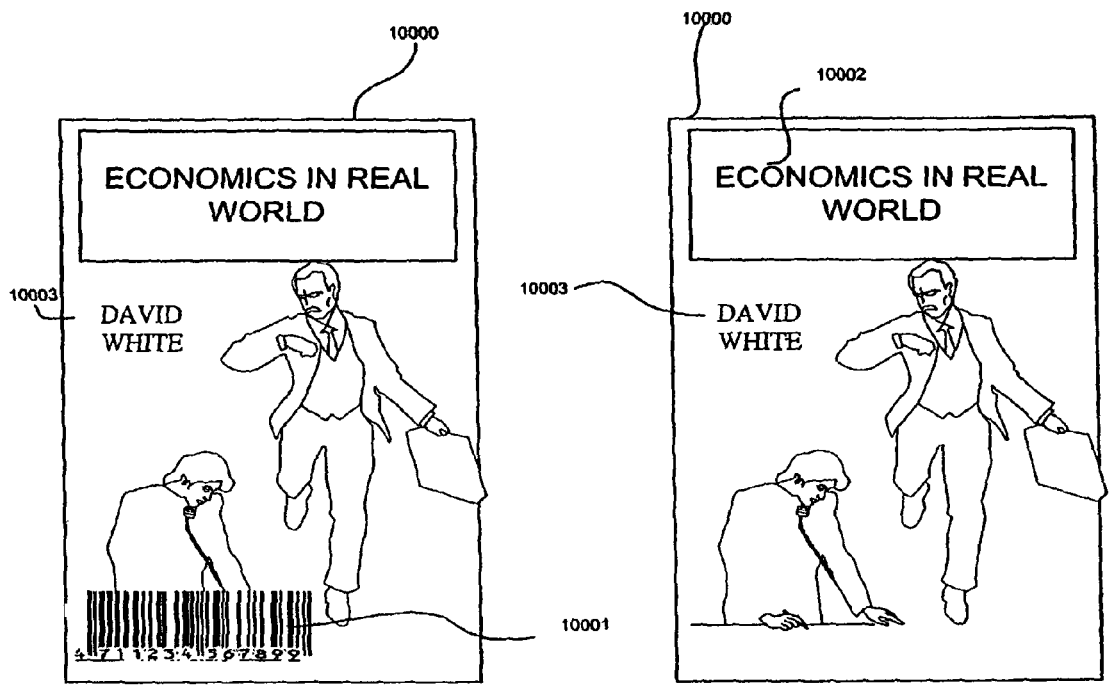
FIG. 12(A) is a graph illustrating the conventional bar code in the prior art.

The feature of the present invention is different from conventional bar code. FIG. 12(A) is a graph illustrating the conventional bar code 10001 in the prior art. FIG. 12(B) is a graph illustrating use of indicators 10002, 10003 of the present invention. In one embodiment, the information implicitly stored in the conventional bar code 10001 is now stored in the graphical indicator 10002 provided by the invention, and the information of an editor or a writer is stored in the graphical indicator 10003 provided by the invention. The graphical indicators 10002, 10003 do not interfere with other main information on the surface 10000.

(F) Application for Coordinate Positioning System

This invention may be implemented into a coordinate positioning system as index value mentioned above is a coordinate value when a coordinate system is predefined over the surface. Under this application, the coordinate positioning system allows a user to make positioning action over a surface of an object while the surface including a main information. The coordinate positioning system includes a coordinate system and a device.

The coordinate system, implemented over the surface, includes multiple coordinate zones. Each coordinate zone includes at least a visually negligible graphical indicator, and the graphical indicator includes multiple graphical micro-units co-existing with the main information over the surface without interference with the main information. The multiple graphical micro-units are arranged in a layout in the graphical indicator, the layout corresponds to an indicator information indicating a coordinate value of each coordinate zone.

The device is used for capturing the layout from the graphical indicator, retrieving the coordinate value responsive to the layout, and providing a response in response to the coordinate value.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for a user reading an image from a selected zone of a surface of an object with an electronic system, the method comprising:

mapping an indicator information to a graphical indicator that has a visually negligible size, the graphical indicator comprising a plurality of state zones for selectively respectively storing a plurality of graphical micro-units, and each of the state zones selecting a state from at least two candidate states;

affixing the graphical indicator onto the surface of the object; and the electronic system retrieving the graphical indicator and outputting an additional information from the graphical indicator;

wherein the surface of the object comprises a main information which overlaps and co-exists with the graphical micro-units are negligible when the user observes the main information;

wherein each graphical micro-unit is printed in an ink that substantially absorbs infrared ray, and the main information is printed in an ink that hardly absorbs infrared ray; and wherein the ink is a black oil ink, and the main information is printed in a Near-K ink that comprises an ink hardly absorbing infrared ray.

2. The method of claim 1, wherein each graphical indicator occupies very small amount of area, and each graphical micro-unit occupies very small amount of area, and number of graphical micro-units of each graphical indicator is substantially equal to each other.

3. The method of claim 1, wherein each square centimeter of the selected zone includes more than 3000 state zones of which less than seventy percent are in the first state, and percentage of area occupied by the graphical micro-unit in the state zone is less than 80.

4. The method of claim 1, wherein each square centimeter of the selected zone includes more than 6000 state zones of which less than seventy percent are in the first state, and percentage of area occupied by the graphical micro-unit in the state zone is less than 80.

5. The method of claim 1, wherein the surface of the object comprises multiple index zones, each index zone corresponding to one index value, and multiple identical graphical indicators are arranged in each index zone.

6. The method of claim 1, wherein the object is a printable vehicle and the graphical indicator is affixed onto the surface of the printable vehicle by printing.

7. The method of claim 1, wherein the graphical indicator is recorded in a vehicle that is affixed onto the surface of the object.

8. The method of claim 1, wherein the graphical indicator comprises a header information and a content information, each header information within each graphical indicator is capable of distinguishing the corresponding graphical indicator from adjacent graphical indicators and indicating the orientation of the corresponding graphical indicator to the optical device.

9. A method for a user reading an image from a selected zone of a surface of an object with an electronic system, the method comprising:

mapping an indicator information to a graphical indicator that has a visually negligible size, the graphical indicator comprising a plurality of state zones for selectively respectively storing a plurality of graphical micro-units, and each of the state zones selecting a state from at least two candidate states;

affixing the graphical indicator onto the surface of the object; and the electronic system retrieving the graphical indicator and outputting an additional information from the graphical indicator;

wherein the surface of the object comprises a main information which overlaps and co-exists with the graphical micro-units are negligible when the user observes the main information;

wherein each graphical micro-unit is printed in an ink that substantially absorbs infrared ray, and the main information is printed in an ink that hardly absorbs infrared ray; and wherein each graphical micro-unit is printed in the Black (K) primitive color ink, and the main information is printed in the Cyan (C), Magenta (M), Yellow (Y) primitive color ink, or a combination thereof.

* * * * *